United States Patent

[11] 3,582,045

| [72] | Inventor | Allen E. Leybourne, III<br>Decatur, Ala. |
|---|---|---|
| [21] | Appl. No. | 820,698 |
| [22] | Filed | Apr. 3, 1969 |
| [45] | Patented | June 1, 1971 |
| [73] | Assignee | Monsanto Company<br>St. Louis, Mo.<br>Continuation-in-part of application Ser. No. 694,503, Dec. 29, 1967, now abandoned. |

[54] POLYMER INTERMINGLER
1 Claim, 4 Drawing Figs.

[52] U.S. Cl. .................................................. 259/4,
138/38, 138/42
[51] Int. Cl. ................................................. B01f 15/00
[50] Field of Search .......................................... 259/4, 18,
36, 95; 138/38, 42

[56] References Cited
UNITED STATES PATENTS
| 189,332 | 4/1877 | Baudelot | 138/38UX |
| 2,284,255 | 5/1942 | Baureschmidt | 259/4 |
| 2,601,018 | 6/1952 | Heyl et al. | 259/4 |
| 2,833,840 | 5/1958 | Longwell | 259/4X |
| 2,838,178 | 6/1958 | Bankes | 259/4X |
| 3,128,794 | 4/1964 | Boucher et al. | 259/4X |

FOREIGN PATENTS
| 729,226 | 5/1955 | Great Britain | 259/4 |
| 298,420 | 11/1965 | Netherlands | 259/4 |

*Primary Examiner*—James Kee Chi
*Attorneys*—James H. Barksdale, Jr. and Robert L. Broad

ABSTRACT: An apparatus for improving the homogeneity of molten heat sensitive polymers when the flow thereof is substantially laminar. The apparatus has a tubular housing into which is snugly fitted a first helical member, and into which is disposed a second helical member of such size as to fit inside the first helical member.

PATENTED JUN 1 1971

3,582,045

INVENTOR.
ALLEN E. LEYBOURNE, III
BY
ATTORNEY 3,582,045

POLYMER INTERMINGLER

CROSS-REFERENCE TO RELATED APPLICATION

This is a continuation-in-part of application Ser. No. 694,503 filed Dec. 29, 1967, now abandoned.

BACKGROUND OF THE INVENTION

1. Field of the Invention

This invention relates to an apparatus having a housing containing right and left-hand helixes which act to mingle molten polymers and reduce thermal degradation.

2. Description of the Prior Art

Heretofore, when molten polymer has been transferred through lines and ducts from one vessel to another or treated in one way or another, there has been excessive thermal degradation of the polymer in the vicinity of the duct walls. When dealing with viscous molten polymers in round, rectangular, and similar ducts, laminar flow is the rule, with the polymer nearest the wall and in contact therewith remaining in the duct longer than the polymer in the center of the duct. Also, there is inherently a temperature gradient between the polymer which is next to the duct wall and the polymer in the center of the duct when the temperature is varied from ambient. This temperature difference and the differences in time the polymer remains in the duct are directly related to any degradation of polymer which occurs. Up until this invention, this situation had either been tolerated with the result being polymer of poorer quality, or had been subjected to later attempts to rectify or compensate for, thus materially affecting economics.

SUMMARY OF THE INVENTION

The difficulties of the prior art are overcome through the use of an intermingler comprising a housing having helical members of opposite hand positioned therein which act to produce cooperating semicircular helical flows of polymer. The structural shapes of the helical members are such that helical channels having semicircular cross sections are formed which cooperate to intermingle polymer.

It is therefore an object of this invention to provide a simple and inexpensive polymer intermingler.

Another object of this invention is to substantially reduce localized polymer degradation through the use of an intermingler.

Yet another object of this invention is to provide for efficient heat exchange without resorting to expensive and complicated high maintenance equipment.

Further, it is an object of this invention to provide an intermingler which may be positioned at any desired point in the standard polymer transfer equipment.

These and other objects and advantages will become more readily apparent when read in conjunction with the remainder of the specification and considered along with the accompanying drawing.

DESCRIPTION OF THE PREFERRED EMBODIMENT

Figure 1:
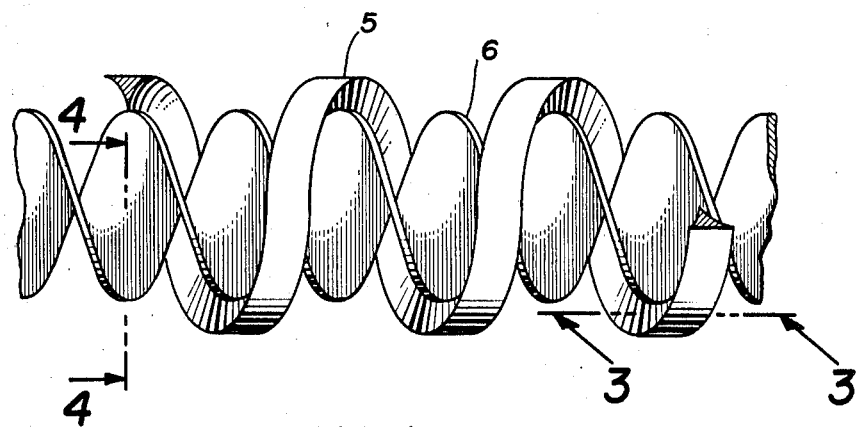
FIG. 1 is an elevation view showing a preferred embodiment of sections of helixes used in an intermingler according to this invention.
Figure 2:
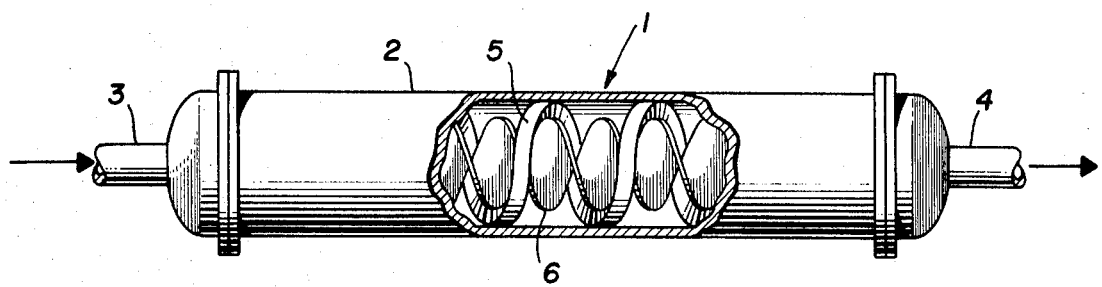
FIG. 2 is an elevation view, partially broken away, showing the intermingler of this invention.

The polymer intermingler shown in FIG. 2 and generally denoted by reference numeral 1 is made up of housing 2 having an inlet 3 and an outlet 4 which are connected to ducts (not shown). Housing 2 is cylindrical and has disposed therein adjacent its inner wall the outer surface of a left-handed helical member 5 extending the length thereof. Although it is not necessary for member 5 to extend the entire length of housing 2, no useful purpose is visualized for having a partially empty housing. Within helical member 5 is disposed a right-handed helical member 6 which also extends the length of housing 2. The labels as to hand are only for purposes of distinction with opposite hands being all that is required.

The difference between the inside diameter of first helical member 5 and the outside diameter of second helical member 6 may be either positive or negative as long as polymer can pass through the intermingler.

Figure 3:
FIG. 3 is a cross-sectional view taken substantially along lines 3—3 of FIG. 1.

The preferred shape of first helical member 5 is springlike with the cross section of the portion extending from the inner wall of the housing being cusp-shaped as shown in FIG. 3.

Figure 4:
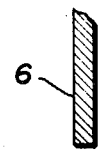
FIG. 4 is a cross-sectional view taken substantially along lines 4—4 of FIG. 1.

The preferred shape of second helical member 6 is that of a twisted ribbon having a substantially rectangular cross section as shown in FIG. 4.

With member 5 being coiled and springlike and with the cross section of the portion thereof extending from the inner wall of the housing being cusp-shaped, a helical channel is formed which is substantially semicircular in cross section. Another substantially semicircular helical channel is formed due to member 6 being in the form of twisted ribbon. Member 6 can also assume the shape of a twist bit where the channels are formed around a rod or an edge of a ribbon.

Further, it is contemplated that member 6 may be of any cross sectional shape which deviates from circular and forms helical channels having substantially semicircular cross sections upon being twisted. In other words, a rod having a square cross section would have four channels upon being twisted, whereas the twisted ribbon of the preferred embodiment would have only two.

While reference herein is made to only one helical member 5, this does not rule out a plurality, or a number of starts. For example, each coil of member 5 may be brought closer together and only one member used or a number of such members may be used to effect closer coil relationship and thereby increase the number of channels formed.

The theory behind these shapes and the effect of the intermingler in general is that polymer characteristic flow profiles in a straight duct having no restrictions remain unchanged from one point to another along the path of transfer. Polymer which starts against the walls remains against the walls; there being nothing in the duct to change this situation. Since an object of this invention is to improve the homogeneity of polymer being transferred through the duct, means have been provided to intermingle the polymer adjacent the walls with the polymer interior thereof.

When transfer of liquid polymer through a helically-shaped duct is considered, slippage occurs adjacent the walls. This polymer helical flow path will lag the path of the helical duct generating a pseudo-displacement and/or slippage of apparent contrary hand to that of the helical duct. This being the case, and the desire to be economical, means have been sought to provide the same situation in ordinary ducts. The positioning of a helical member adjacent the walls of a straight duct solved some of the difficulties, but not all, because the polymer adjacent the helical member was intermingled with itself. To effect intermingling with the polymer in the vicinity of the center of the duct, a second helical member of opposite hand was positioned interior of the first helical member.

The use of helical members in the above-described manner provided substantial intermingling and reduced polymer degradation, but in an effort to further improve the apparatus, it was theorized that the effect on polymer in dead spaces created by corners in square channels or channels having intersecting planar walls could be minimized through the use of channels having semicircular cross sections. In arriving at the preferred shapes of the helical members which would create the preferred channel cross section, several facts had to be taken into account. The helical transfers of polymer should be as close together as possible for effective intermingling. To provide this, there must in essence be a duct with a rod through the center, concentric rod and duct, or duct having solid center in order that polymer flow will be maintained away from the center. Around this solid center or rod, the distribution of the helical flows must be considered. Two separate flows of circular cross section would provide little or no intermingling, whereas cooperating semicircular flows would provide excellent intermingling. The cross-sectional shapes required to generate cooperating semicircular helical flows would substantially assume the configurations shown in FIGS. 3 and 4; taking economics into account.

The cooperation of the first and second helical members can be appreciated from viewing FIGS. 3 and 4, where in operation these members are stationary and as the polymer is fed in through inlet 3, it can experience tumbling, twisting, etc. and become intermingled with itself. This intermingling aids in keeping a greater quantity of the polymer away from any one place, such as the walls, and aids in reducing polymer degradation due to part of the polymer remaining too long in the duct, and the polymer in mass will tend to be more homogeneous as a result of a substantially improved residence time distribution.

It is to be appreciated that an intermingler according to this invention can be utilized and substituted for any section of duct or pipe which exists in the process equipment.

The foregoing illustrates the essential features of the invention as well as some of the manners in which it may be practiced. Various changes and modifications may be made in practicing the invention without departing from the spirit and scope thereof, and therefore, the invention should not be limited except as defined in the appended claims.

I claim:
1. A polymer intermingler comprising:
 a. a housing;
 b. a spring-shaped helical member of one hand, the outer surface of which is positioned adjacent the inside wall of the housing and the portion thereof extending from the inside wall of the housing being substantially cusp-shaped in cross section forming a helical channel of substantially semicircular cross section; and
 c. a twisted ribbon-shaped helical member of opposite hand disposed within the spring-shaped helical member and having a substantially rectangular cross section forming another helical channel of substantially semicircular cross section; said helical members cooperating to produce cooperating semicircular helical flows.